United States Patent [19]

Kaiser

[11] 4,031,641

[45] June 28, 1977

[54] COMBINED CONTAINER AND VIEWER PACKAGE FOR FILM TRANSPARENCIES

[76] Inventor: Jordan Ross Kaiser, Burying Hill Farm, Burying Hill Road, Greenwich, Conn. 06830

[22] Filed: July 6, 1976

[21] Appl. No.: 703,063

Related U.S. Application Data

[63] Continuation of Ser. No. 611,175, Sept. 8, 1975, abandoned.

[52] U.S. Cl. .............................................. 40/63 A
[51] Int. Cl.² ........................................ G09F 11/30
[58] Field of Search ............. 40/63 A, 64 A, 106.1

[56] References Cited

UNITED STATES PATENTS

| 3,061,961 | 11/1962 | Cohen | 40/63 A |
| 3,079,959 | 3/1963 | Johnston | 40/106.1 |
| 3,349,509 | 10/1967 | Balch | 40/63 A |
| 3,566,523 | 3/1971 | Bower | 40/63 A |

Primary Examiner—Louis G. Mancene
Assistant Examiner—Wenceslao J. Contreras
Attorney, Agent, or Firm—Ralph W. Kalish

[57] ABSTRACT

A compact container and viewer for processed film transparencies. The combined unit is a mailable package which can be readily converted to a slide viewer by removing all but a single selected slide from the package. The latter may also function as a storage receptacle. In another form, the combined unit may additionally include a magnifying lens and a light source.

9 Claims, 4 Drawing Figures

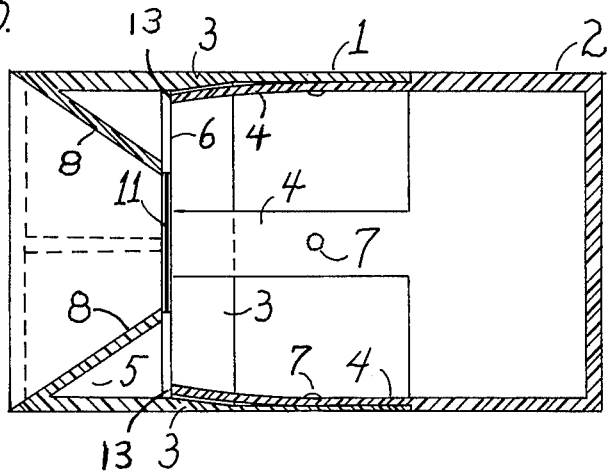
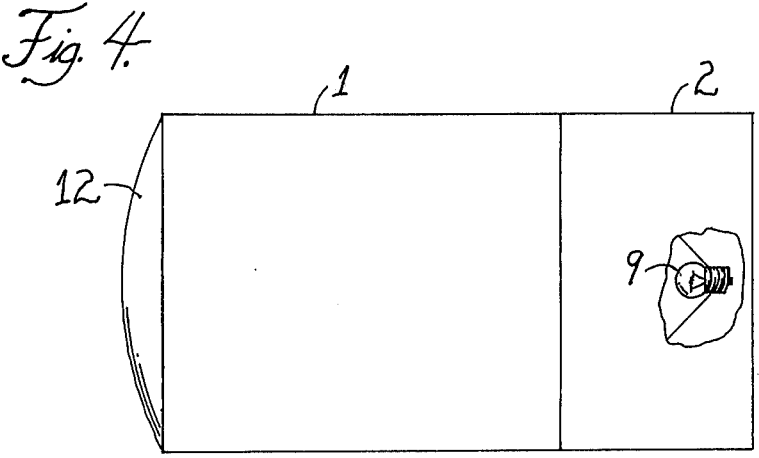

COMBINED CONTAINER AND VIEWER PACKAGE FOR FILM TRANSPARENCIES

This application is a continuation of Ser. No. 611,175 filed Sept. 8, 1975 and now abandoned.

BACKGROUND OF THE INVENTION

In the past, film, such as slide transparencies which were processed in 20 or 36 slide lots, were packaged in containers that held them in a stacked formation. However, the package was only intended as a container for the slides and nothing else.

It is an object of the present invention to provide a combination container and viewer for film slide transparencies which forms a mailable package and in which the person receiving the package, upon easily separating the package, can make use of the viewer portion in order to immediately view the slides on an individual basis.

It is a further object of the present invention to provide a combined film container and viewer which snaps together and apart, the viewer portion being fabricated of a translucent material so that the ambient room light, as well as natural outside light, is diffused, thereby providing sufficient light for the transparencies so that they can be easily observed.

It is a further object of the present invention to provide means for holding individual slides in the viewer that are held in place by the co-action of structures on the front viewer portion and on the back container portion of the package.

Another object of the present invention is to provide a combined viewer and mailable container in which a battery-operated light source is incorporated in the package for film slide viewing purposes.

A further object of the present invention is to provide a magnifying lens for the viewer portion of the package thereby permitting magnification of the film transparencies.

The invention will now be more fully described with reference to the accompanying drawings, in which:

FIG. 3 is a cross-sectional view on a reduced scale of the combined mailable container and slide viewer shown in FIG. 1; and FIG. 4 is a side-elevational view of another embodiment of the invention illustrated in FIG. 3, having a portion thereof broken away for purposes of clarity.

DESCRIPTION OF THE PREFERRED EMBODIMENTS

Figure 1:
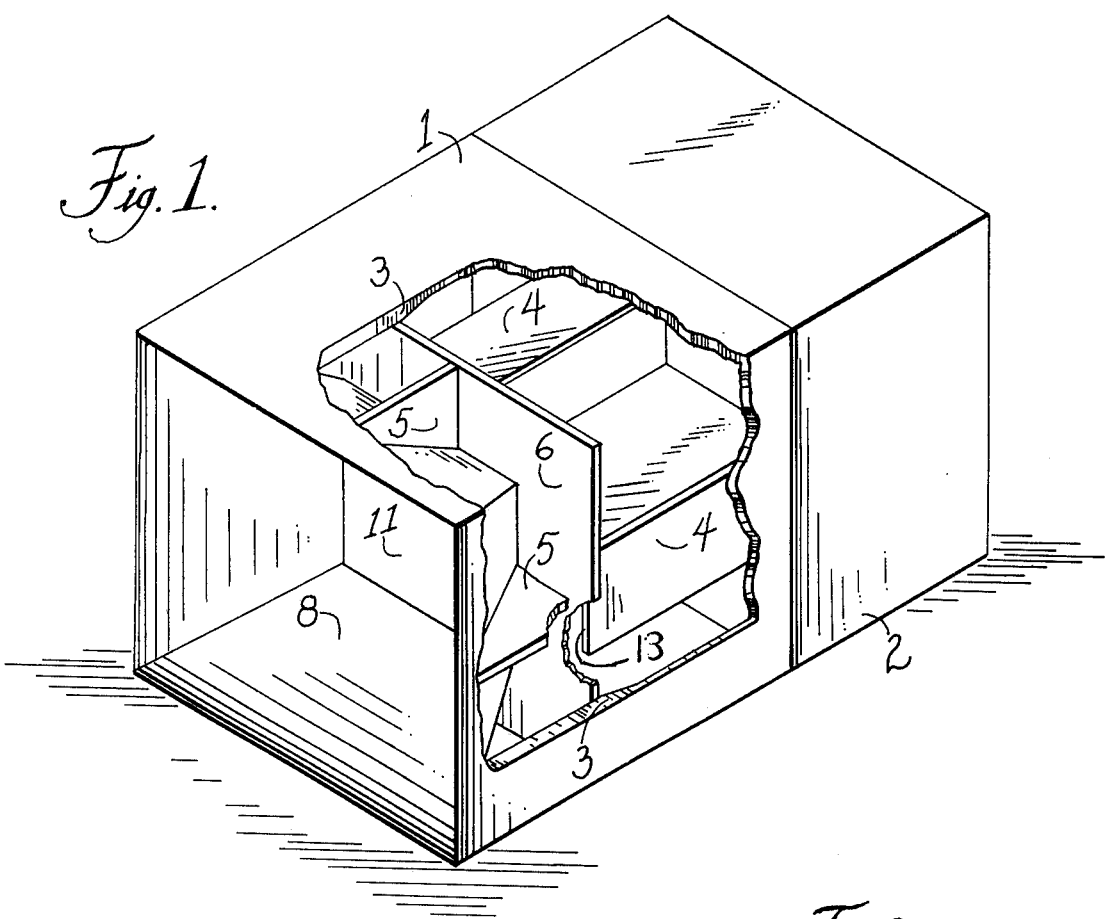
FIG. 1 is a perspective view, partly broken away in order to reveal certain interior portions therof, of a combined mailable container and slide viewer constructed in accordance with the teachings of my invention.
Figure 2:
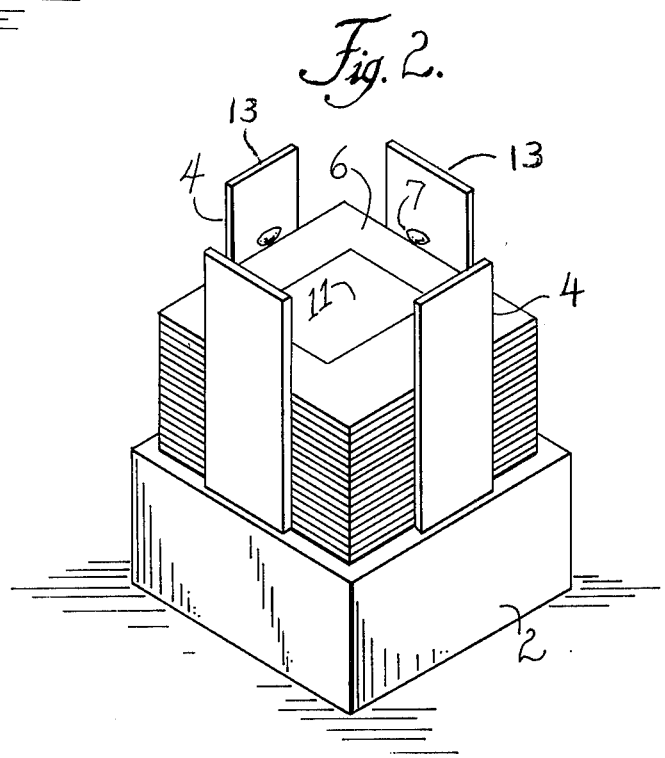
FIG. 2 is a perspective view of the rear container portion of the package disassembled from the front view portion.

Referring particularly to FIGS. 1–3, the compact mailable container and film slide viewer is provided with two separable portions that are readily combined. The front portion 1 is a film transparency viewer that is fabricated of a translucent white plastic, preferably of a high impact type, while the rear portion 2 is the holder for the stack of film transparencies 11. The holder 2 is fabricated of an opaque plastic material, preferably dark in color. It should be observed that the combined holder and viewer forms a unitary package that is utilized for both transit and storage purposes.

The viewer 1 is of a rectangular configuration, with an open front and rear, and is provided with web portions 3 which, as seen in FIG. 3, are reduced in cross-section toward the open rear of the viewer. As seen in FIGS. 1 and 3, gussets 5 are shown spaced at locations about the open front of the viewer 1. In this manner, the transparency mat 6 for the film transparency 11 is prevented from moving forward in the viewer since the gussets serve as backstops for the individual film transparencies.

Referring to FIG. 2, it will be seen that the rear holder portion 2 is provided with four tabs 4 that are spaced from each other and project from the body of the holder 2. The inside surfaces of the tabs 4 are designed to hold stacks of film transparencies 11 by engaging their peripheral mats 6. The buttons or pimples 7 are spaced on each of the tabs 4 so as to hold film transparancy, for example, lots of 20 or 36, which are the usual amounts processed from each roll of film.

As seen in FIG. 3, the rear portion or holder for the stack of film transparencies 11 is inserted within the rear of the front portion 1 of the film transparency viewer and also acts as a transit and storage facility for the slide transparencies. It will be noted that the tabs 4 are constructed of slightly flexible material so that when the rear portion 2 is inserted within the front portion 1, the tabs 4 are constricted inwardly by means of the web portions 3. When this occurs, the slide transparency 11 is firmly engaged in the opening in the front portion 1 of the film transparency viewer by means of the edges 13 abutting against the transparency mat. Thus, as seen in FIG. 3, an individual slide may be placed in the viewer and observed. Of course, other slides may replace each individual slide if required. Thus, it should be observed that each transparency slide may be held in place merely by the mechanical action of the tabs 7 of the back holder portion being constricted by the webs of the front portion of the combined package.

The front viewer portion 1 is provided with frame sections 8 which slope inwardly. This is particularly seen in FIGS. 1 and 3 wherein the film transparency held in place by the web portion 3 and the tabs 7 is particularly framed for viewing purposes.

Referring now to FIG. 4 in which an alternate embodiment of the present invention is shown, it is desired to point out that this construction additionally incorporates a light source 9 which is connected to a power source (not shown). The light source 9 functions to further irradiate the transparency 11 that is secured in the viewer and therefore achieve a certain amount of back lighting for the transparency which is desirable for viewing purposes. In addition, the structure in FIG. 4 is provided with a magnifying lens 12 as the forward end of the front portion of the film transparency viewer. Obviously, a magnifying lens will offer additional clarity to the viewer.

The combined package is so designed and constructed that it can be securely and safely mailed from one destination to another. When the recipient receives the package, he may separate the same and immediately make use of the viewer portion 1 of the combined package without having to find and set up a viewer for purposes of viewing the film transparencies. In addition, the combined unit is convenient for storage purposes, as well as for transit in the mails. The combined package is economical to produce and is reliable for the purposes intended.

What I claim is:

1. A mailable combined container and view package for film transparencies comprising: a substantially rectangular shaped holder for holding a stack of film transparencies and forming one part of said package; a substantially rectangular shaped viewer part provided with an open back end and having a framed opening behind which a single film transparency is located, and means on said holder part for holding said single film transparency in said framed opening when said holder is inserted through the open back end of said viewer part.

2. A mailable combined container and viewer package for film transparencies comprising: a holder having slightly resilient spaced tabs for holding a stack of film transparencies and forming one part of said package; a viewer part forming the other part of said package having a framed opening behind which a single film transparency is located; and means on said viewer part for compressing at least some of said tabs to hold said single film transparency in said framed opening and to additionally retain said parts of the package together upon assembly.

3. The combination as claimed in claim 2 wherein said tabs are provided with projections that hold said stack of film transparencies in place during transit of said package.

4. The combination as claimed in claim 2 wherein said viewer part is provided with gussets that function as back stops for the film transparency positioned in said framed opening 5. The combination as claimed in claim 2 wherein said holder part is fabricated of a translucent material so that ambient light can irradiate the film transparency.

6. The combination as claimed in claim 2 wherein said means on the viewer part for compressing said tabs is the gradually thickened wall of said viewer part from the rear to the front thereof.

7. The combination as claimed in claim 2 further comprising an electric light source for radiating said film transparency.

8. The combination as claimed in claim 2 further comprising a magnifying lens mounted on the front of said viewer and aligned with said framed opening whereby said film transparency can be magnified for additional clarity.

9. The combination as claimed in claim 5 wherein said other part of said package is fabricated of an opaque material.

* * * * *